Figure 1A:
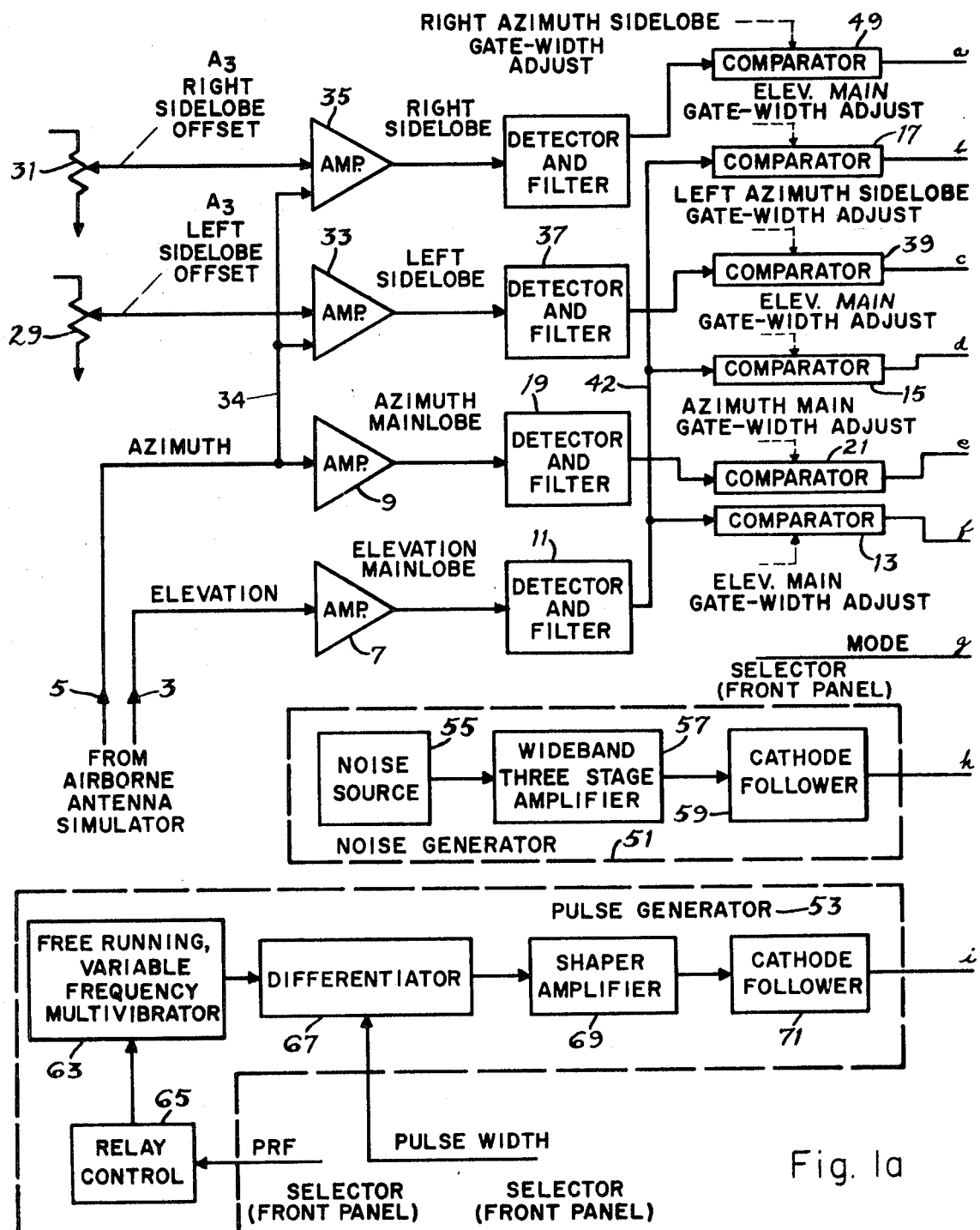

United States Patent

[11] 3,604,828

[72] Inventor Joseph F. Perkovich
    Uniontown, Ohio
[21] Appl. No. 451,702
[22] Filed Apr. 27, 1965
[45] Patented Sept. 14, 1971
[73] Assignee The United States of America as
    represented by the Secretary of the Navy

[54] RADAR-JAMMING TECHNIQUE
    8 Claims, 2 Drawing Figs.
[52] U.S. Cl. .................................................. 35/10.4,
    343/18 E
[51] Int. Cl. .................................................. G09b 9/00,
    G01s 9/00
[50] Field of Search ........................................ 35/10.4;
    343/18 E

[56] References Cited
    UNITED STATES PATENTS
    3,291,885  12/1966  Eisele .......................... 35/10.4
    3,320,349  5/1967   Pollack et al. ................ 35/10.4

Primary Examiner—T. H. Tubbesing
Attorneys—R. I. Tompkins and J. W. Pease

ABSTRACT: This invention relates to a radar simulator, and more particularly to a radar-jamming simulator.

In order to properly train radar operators in the techniques of operating their radar sets in battle conditions, it is necessary to provide them with training recognition of radar jamming, and the appropriate counter measure techniques to employ in the presence of jamming. To do this it is necessary, in the most preferred form, to provide jamming simulation equipment in association with an operational radar set. This jamming simulation equipment would include means to determine when the antenna of the radar is looking at an actual or simulated target which is to be interrogated or intercepted and to supply the desired simulated jamming effects. It is also necessary to display the simulated jamming signals on the operational radar scope or on a simulated radar scope, so that a radar operator may be able to learn how to apply proper defensive measures to minimize the effects of jamming on his radar scope. Various effects are simulated by such jamming simulation equipment including noise and pulse modulation forms of jamming. Additionally, in order to more realistically simulate jamming operating conditions, receiver blocking and magnetron tuning operations by the radar operator, are also simulated.

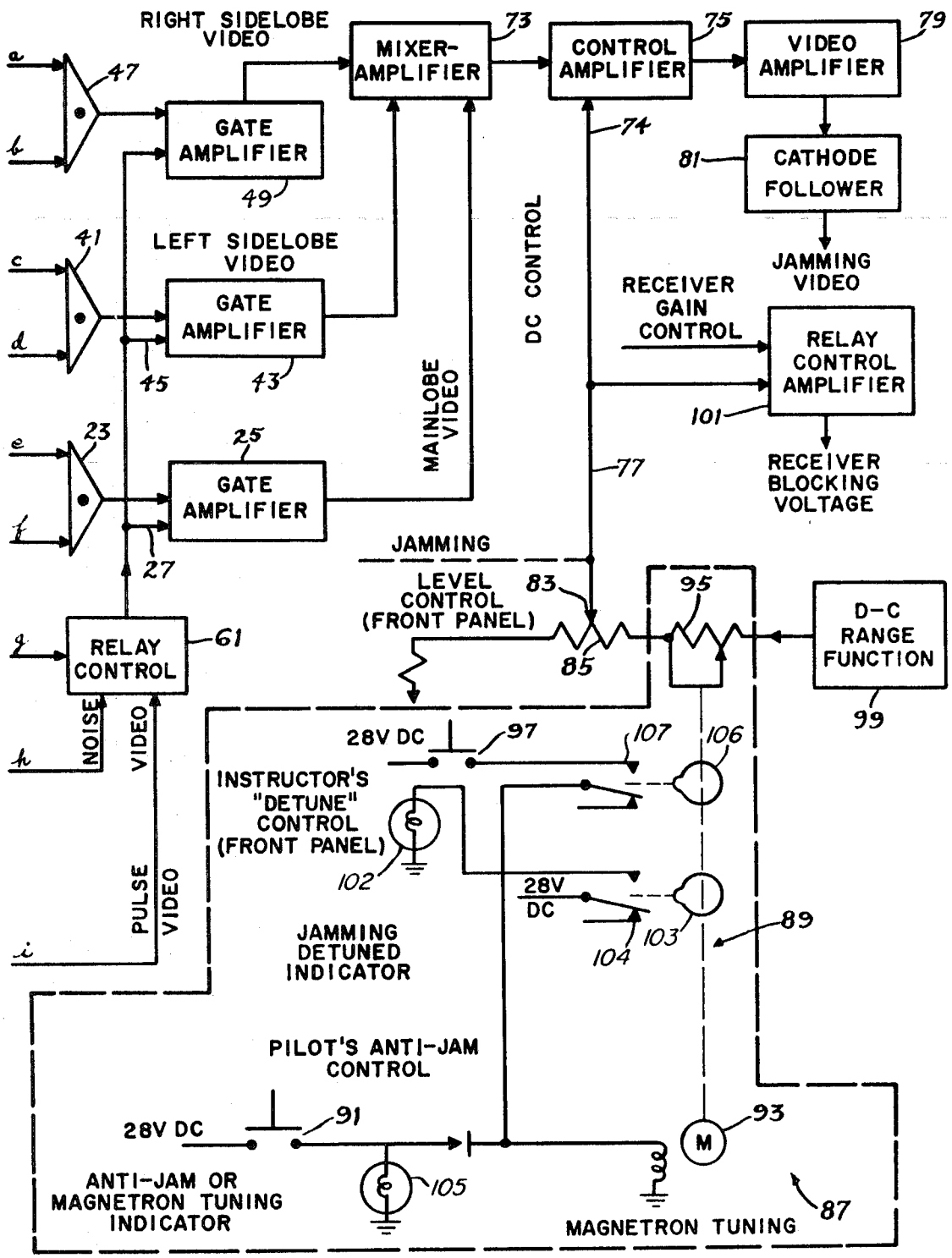
Fig. 1b
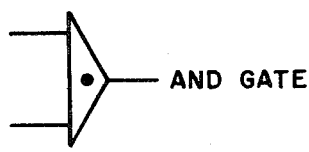

RADAR-JAMMING TECHNIQUE

Therefore, one of the objects of the present invention is to provide a device for simulating a radar-jamming source.

Another object of the invention is to provide a trainer which is used to provide realistic jamming counter measures simulation.

It is a further object of the present invention to provide an improved jamming and jamming counter measure simulator, by realistically simulating receiver blocking.

It is still a further object of the invention to provide a jamming and jamming counter measure simulator which includes magnetron-tuning simulation.

Other objects and many of the attendant advantages of this invention will be readily appreciated as the same becomes better understood by reference to the following detailed description when considered in connection with the accompanying drawing:

FIGS. 1a and 1b is a functional block diagram of one form of a radar jamming and jamming counter measure simulator which embodies the invention.

Briefly stated, the radar-jamming simulator comprises computing equipment for determining the angular position and range of the target with respect to the interceptor's antenna axis, electronic circuitry for gating noise and pulse video signals, and control circuitry for simulating magnetron tuning and receiver blocking. A pulse generator with a variable PRF and with fixed PRF's is provided to develop a pulse-modulated jamming signal. Target azimuth and elevation coincidence signals which occur when the simulated antenna is "looking" at the simulated target, are amplified, detected and filtered and added in a gate comparator circuit to establish a composite DC level for gating the jamming video. The selected jamming video signal is applied to an amplifier which is biased by the computed DC gate voltages to interrupt or pass the jamming video signal. Means are provided for varying the gate width. This gated-jamming video simulates jamming video received on the main lobe of the antenna. Right and left side lobe-gated jamming signals are obtained in the same manner. A DC voltage which is a function of the range to the target, a manual jamming level control and magnetron tuning is provided to bias a control amplifier to vary the amplitude of the jamming signal. The range attenuation voltage is supplied by potentiometers on a slant range servo and a motor-driven potentiometer supplies a DC voltage as a function of magnetron tuning.

Referring to the drawings, the radar-jamming simulator broadly comprises a noise generator, a pulse generator, and a plurality of detection channels which are fed by information signals from a conventional antenna simulator, which provides through gating amplifier means a gating signal when the simulated antenna is "looking at" or "locked on" a simulated target. The noise generator signals and the pulse generator signals are coupled through the gating amplifier means when the simulated antenna is "locked on" the target. The selected form of jamming video passing through said gating amplifier means is then coupled to a control means. The control means includes means for providing magnetron tuning and means for providing a simulated receiver-blocking voltage. Such latter two means vary the effective output jamming video signal which is subsequently mixed with the primary video signal and finally coupled to the radar scope.

Still referring to the drawing, there is shown information signals indicated as "azimuth" and "elevation" which is information which is obtained from a conventional computer means, such as an antenna simulator. The magnitude provided by these information signals is proportional to the angular position of a simulated target with respect to the angular position of a simulated antenna's beam pattern. These signals can be obtained by conventional means, by utilizing original information as to the coordinates of the target, and the coordinates of the antenna and its beam pattern. These coordinates are then referred to the antenna's axis by a translation process, and then into azimuth and elevation information. Such information can be obtained, in a conventional manner, by utilizing azimuth and elevation servos, including resolvers. Resolvers utilized in a conventional manner, would produce "nulls," when the azimuth and elevation antenna servos are at the same angular position as the relative azimuth and elevation servos of the target. These "nulls" therefore occur whenever the simulated antenna is "looking" at the simulated target. The original information signals are derived in a conventional manner, such as by utilizing conventional simulated target and antenna generators which provide coordinate data thereof. The elevation and azimuth information signals which are derived signals of deviation are fed over lines 3 and 5, respectively, at a frequency of 400 cycles in this preferred embodiment to two main channels. These information signals are fed, in each of the channels, to amplifiers 7 and 9, respectively, which amplify said signals. The output from amplifier 7 in the elevation main lobe channel is coupled to a detector and filter means 11. The DC output from the detector and filter means 11 is coupled to comparator means 13 in the main lobe channel, and comparators 15 and 17, in the two side lobe channels. These comparator means are so constructed as to provide an output gate signal, of a fixed amplitude, when the input signal coupled thereto is less than a certain predetermined magnitude, which magnitude is adjustable. In a similar manner the output of the amplifier 9 in the azimuth main lobe channel is coupled to the input of detector filter element 19. The DC output therefrom is coupled to a similar comparator 21 which also has an adjustable width, and its output is coupled to the second input of AND circuit 23. Similarly, comparator 13 of the elevation main lobe channel, has its output coupled to the first input of said AND circuit 23. The output of this AND circuit 23 is then coupled to a control element of a gate amplifier 25, which allows any signal at its input 27 to pass through when there is an output signal from said AND circuit 23. Thus, target azimuth and elevation coincidence signals from the airborne antenna simulator, which occur when the simulated antenna is "looking" at the simulated target, are amplified, detected, and filtered. These DC azimuth and elevation signals are added in a gate comparator circuit to establish a composite DC level for gating the jamming video. The selected jamming video signal is applied to an amplifier which is biased by the computed DC gate voltages. The jamming video is allowed to pass only when the gate voltage decreases to a predetermined valve. A screwdriver adjustment allows the gate-width to be varied. The side lobe channels are similarly constructed except, in order to simulate left and right side lobes, the azimuth information signals are offset a predetermined amount by a plurality of potentiometers 29 and 31. The azimuth information signals are obtained from the azimuth main lobe channel, and are fed to the first inputs of each of the amplifiers 33 and 35, in the side lobe channels. The offset voltages from each of the potentiometers 29 and 31, are fed to the second inputs of these side lobe amplifiers 33 and 35 and provide at the output of each of these amplifiers, what is referred to as a "right side lobe" output and a "left side lobe" output. The output from the left side lobe amplifier 33 is coupled to detector and filter means 37, and its output is coupled to comparator circuit 39. In order to simplify things, in this preferred embodiment, elevation side lobes are not simulated. The output of comparators 39 and 15, are then fed to the two inputs of an AND circuit 41. The output of this AND circuit 41 is fed to the control element of the left side lobe gate amplifier 43, which controls the passage of any jamming video occurring at its input 45. The right side lobe channel is connected and constructed in the same manner, and provides at its output at AND element 47, a control signal which is in turn coupled to its gate amplifier 49.

The jamming video is supplied by either of two generators, a noise generator 51 or a pulse generator 53. Noise generator 51 includes a noise source means 55 which may include a gas tube to provide the necessary noise, and has its output coupled to the input of wide band, three-stage amplifier 57. The output of said amplifier 57 is then coupled to the input of a cathode follower 59. The output of this cathode follower 59 is then coupled to the first input of a two-input relay control means 61. The second input is fed from the output of the pulse generator 53. The pulse generator 53, which provides the pulse video form of jamming, includes a free running, variable frequency, multivibrator 63, which has its frequency varied by a relay control means 65, coupled to its input which can vary its frequency. The frequency of said free running, variable, frequency multivibrator 63 is selected by an instructor through a control on a front panel of a console, which is coupled to the input of said control means 65. The output of said multivibrator 63 is coupled to the input of differentiator 67. This differentiator 67 is also variable, and has one of its elements varied from another control means located on the front panel of the instructor's console so as to vary the pulse width of the differentiator's output signal. The output signal from the differentiator 67 is then coupled to a shaper amplifier 69, which is operated at a saturation point. The output of said shaper amplifier 69 is coupled to the input of a second cathode follower 71 and it is in turn coupled to the second input of the relay control means 61. This relay control means 61 is also controlled from the instructor's front panel control so as to select the particular mode or form of jamming video desired. The output of said relay control means 61 is coupled to each of the second inputs of the three gate amplifiers 25, 43 and 49. Each of the outputs of the three gate amplifiers 25, 43 and 49 are respectively coupled to one of three inputs of a mixer-amplifier 73. The output of said mixer-amplifier 73 is then coupled to a control amplifier 75. This control amplifier 75 is controlled by the input bias DC coupled over line 77. This bias DC control affects the output from the control amplifier 75. The output from said control amplifier 75 is coupled to a video amplifier 79 and hence to a cathode follower 81. The resulting jamming video signal is then coupled to another mixer (not shown), which combines the primary video and this jamming video. The output of said mixer is then coupled to a cathode follower; and the composite video is then transmitted to the radar means utilized with this device. Additionally, but not shown, target, window and sea return video as well as background noise, and range marks can be coupled to said mixer, so as to provide additional forms of realistic radar scope presentations. The jamming level in the first instance, at the output of the control amplifier 75, may be varied by the arm 83 of potentiometer 85. This arm 83 will be coupled to a control means on the front panel of the console which the instructor can operate. The magnetron tuning means 87 which simulates a varying of the radar's carrier frequency, includes a cam and motor arrangement 89, which is controlled by the pilot or trainee by activating switch 91, which operates motor 93, which is coupled to an arm of potentiometer 95, to effectively vary the DC control voltage coupled to control amplifier 75 over line 77. Additionally, the instructor can, in a similar manner "detune" from the front panel, so as to simulate detuning of the jamming frequency from the operational frequency of the radar means by a relay switch 97 associated with the previous mentioned cam and motor means 89. The motor-driven potentiometer 95 is positioned when the pilot activates switch 91 to simulate tuning from one end of the tunable magnetron frequency range to the other. As the magnetron is tuned away from the jamming frequency, the jamming signal level decreases. An indicator light 102 on the instructor's panel is energized by cam 103 and switch 104 when the pilot is detuning from the jamming frequency. Another light 105 is energized by cam 106 and switch 107 when the instructor is detuning by means of the relay switch 97. At one end of the magnetron-tuning potentiometer 95 there is coupled a range function generator 99 which provides a DC output voltage which is directly proportional to the simulated range. Additionally, there is provided a relay control amplifier 101, which provides a simulator receiver blocking voltage at its output which is then coupled to the radar means and blanks its radar indicator under certain conditions. This relay control amplifier 101 has as its input the DC control voltage on line 77.

In operation, the instructor selects through a mode selector control means (not shown) which is connected to the relay control means 61, the particular form of simulated radar-jamming video desired, either the noise video or the pulse video. If the pulse video has been selected, the instructor would additionally select the particular pulse repetition frequency, by another selector control means (not shown), on the front panel. This latter control means is coupled to a relay control means 65 connected to the free running, variable frequency, multivibrator, which varies the circuit elements therein so as to change the particular output square wave output frequency. The square wave output frequency of the particular frequency selected, is then coupled to the input of a controllable differentiator 67 which provides a differentiated output signal at its output. The pulse width of said output signal from said differentiator 67 is also selected by the instructor from another front panel control and effectively varies one of the elements of said differentiator 67, thereby varying the pulse width of said differentiated signals. These differentiated output signals from differentiator 67 are then coupled to the input of a shaper amplifier 69, which is operated at saturation so as to properly shape said input signals into pulses of the desired shape. This shaped pulse is then coupled from the output of said shaper amplifier 69 to a cathode follower 71, which in turn has its output coupled to one of the inputs of said relay control 61. The relay control will then allow the pulse video to be coupled therethrough to its output and the video signals will be fed to the inputs of three gating amplifiers 25, 43 and 49. The noise video is generated by a noise generator 51 including a noise source means 55, which provides the required noise signals. Its output is then coupled to the input of a wide band, three-stage amplifier 57, which amplifies said noise signals and couples them at its output, to the input of a cathode follower 59. The output of this cathode follower is similarly coupled to one of the inputs of said relay control 61. If this particular form of jamming video is selected by the instructor, it will be coupled through the relay control 61, and then fed to the inputs of each of the three-gate amplifiers 25, 43 and 49.

The information signals which provide the azimuth and elevation information, whose magnitudes are proportional to the angular position of a simulated target with respect to the angular position of a simulator antenna, are coupled to the main lobe channel over lines 5 and 3 respectively. These information signals have been modulated by information as to the position of the target and the antenna, and provide "nulls" which indicate when the antenna is "on target" or "looking at" the target. The main lobe channel is used to determine when the simulated target is within the beamwidth of the antenna's main lobe and operates as follows. The 400-cycle-elevation information signals are coupled over line 3 to the input of amplifier 7 in the elevation main lobe channel and is amplified thereby. The output of said amplifier 7 is then coupled to the input of a detector and filter means 11. This detector and filter means 11 converts the 400-cycle-amplified information at its input into a DC voltage, at its output, which is proportional in magnitude to the magnitude of the AC input voltage. This DC voltage from said detector and filter 11, is then coupled to the inputs of three comparator means 13, 15 and 17. Each of these comparator means 13, 15 and 17 provide an output signal when the input DC signal coupled at its input is less than a certain predetermined value, the magnitude of which is proportional to the beamwidth of the particular lobe simulated. This particular predetermined value, referred to as the "gate-width," is adjustable in each of the comparators. Thus comparator 13 of the elevation main lobe channel, provides an output signal which is one of the inputs to an AND circuit 23 when the antenna, in elevation, is "looking at" the target. The azimuth main lobe channel functions in a similar manner, except that the particular gate width may be different than the value set in the elevation main lobe comparator, since the characteristics of the antenna beam simulated in elevation and azimuth may not be the same. As was explained by the operation of the elevation main lobe channel, an output voltage from the comparator 21 will be coupled to the other input terminal of the AND circuit 23, when the antenna, in azimuth, is "looking at" the target. When there are two inputs at the main lobe AND element 23, an output signal will be produced to operate its associated gate amplifier 25 to allow any jamming video coupled at its input 27 to pass therethrough to mixer-amplifier 73. Thus, when the simulated target is within the beamwidth of the main lobe of the simulated antenna, or when the antenna is "on target," there will be provided a gating control signal which is coupled to the input of the main lobe gate amplifier 25, which will allow any jamming video present at the input 27 to be coupled therethrough to the mixer-amplifier 73. Both the right side lobe and left side lobe antenna channels function in substantially the same manner. In order to provide the left and right side lobe information signals there are provided two "offset" potentiometers 29 and 31 which have their arms coupled, respectively, to a left side lobe amplifier 33, and a right side lobe amplifier 35. The other inputs to each of these amplifiers 33 and 35, are transmitted over line 34, thereby being supplied main lobe azimuth information signals. By the utilization of said potentiometers, and the resulting offset voltages to the azimuth information signals, there is simulated at the output of said side lobe amplifiers 33 and 35, the antenna's side lobe information signals in azimuth as the null is effectively shifted to the right and left of the main "null." Such information, referred to as the "right side lobe information," and "left side lobe information," is detected and filtered in the same manner as previously described with respect to the main lobe channels and is coupled to individual comparators for each of the side lobe channels, comparator 39 and comparator 49, each of which have individually controllable, gate widths. Additionally, there are two comparator means 15 and 17, which have as their inputs, DC signals proportional to the antenna's main lobe, in elevation, which is coupled over line 42, from the output of the elevation main lobe detector and filter 11. It is has been assumed that the simulation of the elevation side lobes is not required, hence simplifying the device by transmitting the main lobe elevation information signals over line 42. Thus, when a target is within either the simulated antenna's side lobe's there will be produced an output-gating control signal from the respective side lobe channels to activate its associated gate amplifiers, to allow passage of any jamming video present at such time. Such jamming video, which would be passed, would then be fed to the appropriate input of said mixer-amplifier 73. Of course, as the range decreases, the main and side lobes merge, producing signals at all the inputs to the mixer-amplifier 73. The output of this mixer-amplifier would then be coupled to a DC controllable amplifier 75, whose output signal's magnitude would be controlled as a function of the magnitude of the DC control voltage coupled at its control input 74. The output signal from said control amplifier 75, will be then amplified by video amplifier 79, and then coupled to cathode follower 81. The output from said cathode follower, the jamming video, can then be coupled to another mixer (not shown), to sum various other possible simulated conditions, including target video, and then coupled to another cathode follower (not shown). From there the composite video will be coupled to the radar means associated therewith. The magnitude of the input DC control to the input 74 of control amplifier 75 is a function of three independent elements. The first of these elements is a potentiometer 85 whose arm 83 may be varied by an instructor through controls on a console, so as to vary the overall jamming level at the output of said control amplifier 75. Additionally, there is a range voltage obtained from a range function generator 99, whose magnitude is dependent upon the particular slant range, of the simulated target to the interceptor's antenna, and it is coupled over line 77 to the input 74 of said control amplifier 75. This voltage produced by said range function generator 99 is not necessarily proportional to the range. This is because the jamming level at the input of an operational radar antenna is not directly proportional to the range at which the jamming signals emanate, and further depends upon the particular jamming unit employed, hence, such range function generator 99, means must be calibrated accordingly. The magnetron's tuning means 87, are controlled by a student trainee and the instructor observer. The function of this magnetron tuning means 87 is to provide simulated realistic dejamming procedures for the pilot trainee. This is accomplished by the pilot, by varying the radar means carrier frequency, so as to supply jamming counter measures to the radar means whenever he realized that his radar means have been jammed. Such tuning is simulated by utilizing a cam-driven motor unit 89 which is controlled at the pilot's console (not shown), by the trainee actuating a switch 91, which activates a motor 93, which in turn varies the effective voltage coupled at the arm 83, of the jamming level control potentiometer 85, by varying the series resistance of potentiometer 95, which is coupled at one end to the jamming level control potentiometer 85, and at the other end to the output of the range function generator 99. It is then seen, that in this manner, the particular DC control signal coupled to the control amplifier 75, may effectively be varied by a pilot trainee attempting dejamming procedures. Additional controls are provided so that the instructor, at an appropriate time, may detune the simulated magnetron, for whatever purpose desired, by activating switch 97, which in turn will change the series resistance of potentiometer 95.

Simulated receiver blocking voltage is also generated by a relay control amplifier 101, which has as its input, effectively four variables. They are the particular jamming level control selected by the instructor, through potentiometer 85, the voltage produced by both magnetron tuning, and the rage generator 99, and the receiver's gain control. The first three elements provide a sum voltage which is coupled over line 77 to one input of the relay control amplifier 101. The other input is controlled by the receiver's gain control, and varies the gain of the relay control amplifier 101. When a sufficient level is reached a receiver blocking voltage is generated at the output thereof, which is coupled to a relay means to remove the previously mentioned composite simulated video signal from the radar means and hence this video is therefore blanked out on the radar indicator of the radar means in the situation when the simulator antenna is "looking at" the simulated target and the other conditions are such as to result in this receiver-blocking condition.

Obviously may modifications and variations of the present invention are possible in the light of the above teachings. It is therefore to be understood that within the scope of the appended claims the invention may be practiced otherwise than as specifically described.

What is claimed is:

1. A radar-jamming simulator, utilized with a radar means, which when supplied with electrical information signals whose magnitudes are proportional to the angular position of a simulated target with respect to the angular position of a simulated antenna, provides realistic jamming and jamming countermeasure simulation, comprising:
    first means for receiving said electrical information signals and for producing a gating control signal when the simulated antenna is on target;
    jamming means, for producing simulated radar-jamming signals;
    gating means, coupled to said first means and said jamming means, for gating simulated radar-jamming signals by said gating control signal; ad
    control means, coupled to said gating means, for controlling the output simulated radar-jamming signals.
2. The device as in claim 1, in combination with;
    detuning means connected to said control means and gating means, for simulated antijamming by simulating changing the operating conditions of the radar means.
3. The device as in claim 2, in combination with;

blocking means, coupled to said detuning and control means, for producing simulated receiver blocking.

4. A radar-jamming simulator utilized with a radar means, which when supplied with the electrical information signals whose magnitudes are proportional to the angular position of a simulated target with respect to the angular position of a simulated antenna, provides realistic jamming and jamming countermeasure simulation, comprising:
  first means for producing noise and pulse video signals to simulate jamming conditions;
  gating means, connected to said first means for gating the simulated radar-jamming signals when said simulated antenna is on-target, said gating means having an output; and
  tuning and blocking means, coupled to said gating means output, for controlling the output simulated radar-jamming signals.

5. The device as in claim 4, wherein said tuning and blocking means includes, a controllable amplifier means.

6. The device as in claim 5, in combination with; range means, coupled to said controllable amplifier means, for providing an output signal which is proportional, in magnitude, to the simulated range.

7. The device as in claim 1, wherein said first means includes, a plurality of channels, one of which channels comprises means for determining when said simulated target is within the simulated antenna's main lobe, and another of said plurality of channels, comprises means for determining when said simulated target is within the simulated antenna's side lobe.

8. The device as in claim 7, wherein each of said plurality of channels includes, comparator means, having a gate width proportional to the beam width of the simulated antenna lobe simulated.